US012675388B1

(12) United States Patent
Tong et al.

(10) Patent No.: US 12,675,388 B1
(45) Date of Patent: Jul. 7, 2026

(54) BIDIRECTIONAL VISUAL INDEXING SYSTEM AND METHOD FOR CODEBASE IMPACT ANALYSIS

(71) Applicant: Morgan Stanley Services Group Inc., New York, NY (US)

(72) Inventors: Albert Hugh Tong, New York, NY (US); Melanie Lislie Hsu, Holmdel, NJ (US); Eric Matthew Burger, Troy, NY (US); Michael Tamburro, Provincetown, MA (US); Daniel Weigh, Rineyville, KY (US); Randy Douglas Furman, Calgary (CA); Pavel Maslov, North Bergen, NJ (US)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 19/356,313

(22) Filed: Oct. 13, 2025

(51) Int. Cl.
G06F 11/3668 (2025.01)
G06F 16/22 (2019.01)
G06F 16/2458 (2019.01)

(52) U.S. Cl.
CPC ...... *G06F 11/3672* (2013.01); *G06F 16/2237* (2019.01); *G06F 16/2458* (2019.01); *G06F 2201/80* (2013.01)

(58) Field of Classification Search
CPC .................................................. G06F 11/3672
See application file for complete search history.

(56) References Cited

U.S. PATENT DOCUMENTS

| | | | | |
|---|---|---|---|---|
| 10,430,526 | B2 * | 10/2019 | Marceau | ................ H04L 67/12 |
| 10,599,399 | B2 * | 3/2020 | Chen | .................... G06T 7/0002 |
| 10,769,250 | B1 * | 9/2020 | Tautschnig | ........... G06F 21/577 |
| 11,327,749 | B2 | 5/2022 | Gupta et al. | |
| 11,340,895 | B2 * | 5/2022 | Tommasi | ........... G06F 9/44505 |
| 11,467,824 | B2 * | 10/2022 | Yang | .................. G06F 11/3698 |
| 11,531,536 | B2 * | 12/2022 | Goern | ...................... G06F 8/77 |

(Continued)

OTHER PUBLICATIONS

Xu, Haowen, Jose Tupayachi, and Xiao-Ying Yu. "Context-Aware Visual Prompting: Automating Geospatial Web Dashboards with Large Language Models and Agent Self-Validation for Decision Support." (2025).*

(Continued)

*Primary Examiner* — Francisco J Aponte
(74) *Attorney, Agent, or Firm* — Hunton Andrews Kurth LLP

(57) ABSTRACT
Systems and methods for implementing bidirectional visual indexing of a codebase are disclosed. An embodiment of the present invention receives a user input comprising at least one of: a screenshot, a text query, a code diff or a URL link; queries a database to identify one or more related screens based on the user input by comparing vector representations of the user input and a set of data frames; provides a set of metadata for the identified one or more related screens wherein the set of metadata comprises: similarity scores, usage statistics, associated code segments, and network requests; identifies at least one relevant function associated with each of the one or more related screens; performs an impact analysis related to modifying the at least one relevant function using an artificial intelligence (AI) processor; and generates a risk analysis for the modifying of the at least one relevant function.

16 Claims, 5 Drawing Sheets

(56) References Cited

U.S. PATENT DOCUMENTS

| | | | | |
|---|---|---|---|---|
| 11,835,995 | B2 * | 12/2023 | Nussinovitch | G06F 18/23 |
| 12,061,896 | B2 * | 8/2024 | Bowen | H04L 67/1097 |
| 12,210,487 | B2 | 1/2025 | Madisetti et al. | |
| 12,314,301 | B2 * | 5/2025 | Chandel | G06F 16/338 |
| 12,400,080 | B2 * | 8/2025 | Guttappa | G06F 16/334 |
| 12,487,811 | B2 * | 12/2025 | Matos | G06F 8/65 |
| 2012/0159433 | A1 * | 6/2012 | Ahadian | G06F 16/2365 |
| | | | | 717/113 |
| 2014/0181796 | A1 * | 6/2014 | Singh | G06F 11/3668 |
| | | | | 717/132 |
| 2014/0189576 | A1 * | 7/2014 | Carmi | G06V 10/757 |
| | | | | 715/781 |
| 2015/0089478 | A1 | 3/2015 | Cheluvaraju et al. | |
| 2015/0095892 | A1 | 4/2015 | Baggott et al. | |
| 2016/0239402 | A1 * | 8/2016 | Zieder | G06F 8/20 |
| 2018/0101465 | A1 * | 4/2018 | Keinan | G06F 11/3604 |
| 2020/0241849 | A1 * | 7/2020 | Marthala | G06F 8/34 |
| 2020/0379886 | A1 * | 12/2020 | Potter | G06F 11/3676 |
| 2021/0397546 | A1 | 12/2021 | Cser et al. | |
| 2021/0406001 | A1 * | 12/2021 | Yang | G06F 11/3698 |
| 2022/0237108 | A1 * | 7/2022 | Jain | G06F 11/368 |
| 2022/0308862 | A1 * | 9/2022 | Espinha | G06N 20/00 |
| 2022/0405193 | A1 | 12/2022 | Ashok et al. | |
| 2023/0196021 | A1 * | 6/2023 | Guttappa | G06F 16/334 |
| | | | | 704/9 |
| 2023/0244596 | A1 * | 8/2023 | Tatunashvili | G06F 9/5038 |
| | | | | 717/124 |
| 2023/0252059 | A1 * | 8/2023 | Nussinovitch | G06F 16/532 |
| | | | | 707/769 |
| 2023/0401057 | A1 * | 12/2023 | Goyal | G06F 8/73 |
| 2024/0028327 | A1 * | 1/2024 | Deshpande | G06F 8/77 |
| 2024/0338310 | A1 | 10/2024 | Bendert et al. | |
| 2024/0419575 | A1 | 12/2024 | Hawkler | |
| 2025/0028625 | A1 | 1/2025 | Lawler et al. | |
| 2025/0028626 | A1 | 1/2025 | Lawler et al. | |
| 2025/0036555 | A1 | 1/2025 | Brar et al. | |
| 2025/0045035 | A1 | 2/2025 | Asenov et al. | |
| 2025/0045049 | A1 | 2/2025 | Sundaresan et al. | |
| 2025/0068665 | A1 | 2/2025 | Chandel et al. | |
| 2025/0138813 | A1 * | 5/2025 | Likhitha | G06F 8/35 |

OTHER PUBLICATIONS

Esfahani, Zeinab Namakizadeh. "Understanding UI Screenshots: Generating Natural Language Descriptions to Support Problem Analysis." (2025).*

Hanam, Quinn, Ali Mesbah, and Reid Holmes. "Aiding code change understanding with semantic change impact analysis." 2019 IEEE international conference on software maintenance and evolution (ICSME). IEEE, 2019.*

* cited by examiner

BIDIRECTIONAL VISUAL INDEXING SYSTEM AND METHOD FOR CODEBASE IMPACT ANALYSIS

FIELD OF THE INVENTION

The present invention relates generally to software development and code analysis, and more specifically to bidirectional visual indexing systems and methods that enable an ability to query code segments using contextual images, text, pull requests and/or function names and provide automated impact analysis for code changes in codebases.

BACKGROUND

Software development organizations face increasing challenges when working with large, complex codebases that have evolved over many years. As applications grow in size and complexity, understanding the relationships between different components becomes increasingly difficult. Developers often struggle to determine which parts of an application might be affected when making changes to specific code segments, particularly in legacy systems where institutional knowledge is limited.

Traditional approaches to code analysis rely on static analysis techniques that examine source code without executing it. These approaches, however, fail to capture the full scope of how changes might impact the user experience or runtime behavior of an application. Static analysis will miss dynamic relationships that only become apparent during actual execution of the software.

Impact analysis, which involves determining what parts of a system might be affected by proposed changes, is frequently performed manually by developers of all experience levels. This process relies heavily on institutional knowledge and familiarity with the codebase. Conventional approaches to impact analysis are time-consuming, prone to human error, and increasingly unreliable as codebases continue to grow while institutional knowledge remains lacking.

Modern software development practices increasingly emphasize rapid deployment cycles and continuous integration, placing additional pressure on development teams to quickly and accurately assess the impact of code changes. The ability to efficiently analyze potential impacts and generate appropriate testing strategies has become increasingly valuable for maintaining software quality while meeting aggressive deployment schedules.

Accordingly, there is a need for an improved system and method for an advanced indexing system that enables the ability to query code segments using contextual images and related data and further supports automated impact analysis for code changes in legacy codebases.

SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

According to an embodiment of the present invention, a computer-implemented system for bidirectional visual indexing of a codebase. The computer-implemented system comprises: an input interface configured to receive one or more inputs from an interaction with an application executing on a device; a database configured to store data frames captured during runtime of the application; and a server comprising a computer processor coupled to the interface and the database and further configured to perform the steps of: receiving a user input comprising at least one of: a screenshot, a text query, a code diff or a URL link; querying the database to identify one or more related screens based on the user input by comparing vector representations of the user input and a set of data frames; providing a set of metadata for the identified one or more related screens wherein the set of metadata comprises: similarity scores, usage statistics, associated code segments, and network requests; identifying at least one relevant function associated with each of the one or more related screens; performing an impact analysis related to modifying the at least one relevant function using an artificial intelligence (AI) processor; and generating a risk analysis for the modifying of the at least one relevant function.

According to another embodiment, a computer-implemented method comprises the steps of: receiving, via an input interface, a user input comprising at least one of: a screenshot, a text query, a code diff or a URL link, wherein the input interface is configured to receive one or more inputs from an interaction with an application executing on a device; querying a database to identify one or more related screens based on the user input by comparing vector representations of the user input and a set of data frames, wherein the database is configured to store data frames captured during runtime of the application; providing a set of metadata for the identified one or more related screens wherein the set of metadata comprises: similarity scores, usage statistics, associated code segments, and network requests; identifying at least one relevant function associated with each of the one or more related screens; performing an impact analysis related to modifying the at least one relevant function using an artificial intelligence (AI) processor; and generating a risk analysis for the modifying of the at least one relevant function.

An embodiment of the present invention provides a unique combination of technical features including: bidirectional image search, user journey prediction and integration with external systems for risk analysis. The bidirectional image search provides an ability to query for code segments using contextual images taken from an end-user application point of view. With user journey prediction, the system may highlight an expedited path to test case rather than rote replication of the session that generated the screenshot. Integration with external systems supports comprehensive risk analysis and automated testing based on code changes and test case data.

The foregoing general description of the illustrative embodiments and the following detailed description thereof are merely exemplary aspects of the teachings of this disclosure and are not restrictive.

BRIEF DESCRIPTION OF THE DRAWINGS

In order to facilitate a fuller understanding of the invention, reference is made to the attached drawings. The drawings should not be construed as limiting the invention, but are intended only to illustrate different aspects and embodiments of the invention.

DETAILED DESCRIPTION

Exemplary embodiments of the invention will be described in order to illustrate various features of the invention. The embodiments described herein are not intended to be limiting as to the scope of the invention, but rather are intended to provide examples of the components, use, and operation of the invention.

An embodiment of the present invention is directed to providing bidirectional visual indexing of a codebase with change-set risk quantification and analysis. An embodiment of the present invention identifies code segments that need to be changed to affect a particular part of an application and further assesses various risk metrics associated with making the code change.

An embodiment of the present invention is directed to a data set generator that gathers information from a run-time session. This includes backend data from network requests, analytics calls to understand the user journey, functions that were executed at the time each screen was rendered, defect metrics, revenue impact, and metadata extracted from screenshots using optical character recognition (OCR), and/ or other image analysis tools and techniques. In addition, large language model (LLM) based techniques may be applied.

In addition, an embodiment of the present invention supports an ability to perform a bidirectional semantic search through various types of inputs. For example, a user may submit a screenshot where the metadata may be extracted and used to identify corresponding features, pages and/or other content. A user may also submit a text query which may be used to identify a closest page. In addition, a user may submit a list of functions that represent a set of code changes. Other types of inputs (e.g., links, URLs (uniform resource locator), pull requests, etc.) may also be supported. Inputs may be from a user, a system, a data feed and/or other source.

The system allows users of all experience levels and roles-including developers, testers, product owners, and customer support specialists-to accurately quantify the risk of a code change, even when institutional knowledge on the team is low. This further enables the ability to accelerate triaging production issues.

An embodiment of the present invention leverages Generative Artificial Intelligence (Gen AI) to convert relevant information into embeddings. The embeddings may be used to match user-submitted screenshots or other inputs to underlying features and assess the impact of making a corresponding code change, including semantically similar data fields and/or functions used by other pages. An embodiment of the present invention may assess the impact to the user experiences by taking runtime data into account in contrast to conventional solutions that focus solely on a static codebase.

Figure 1:
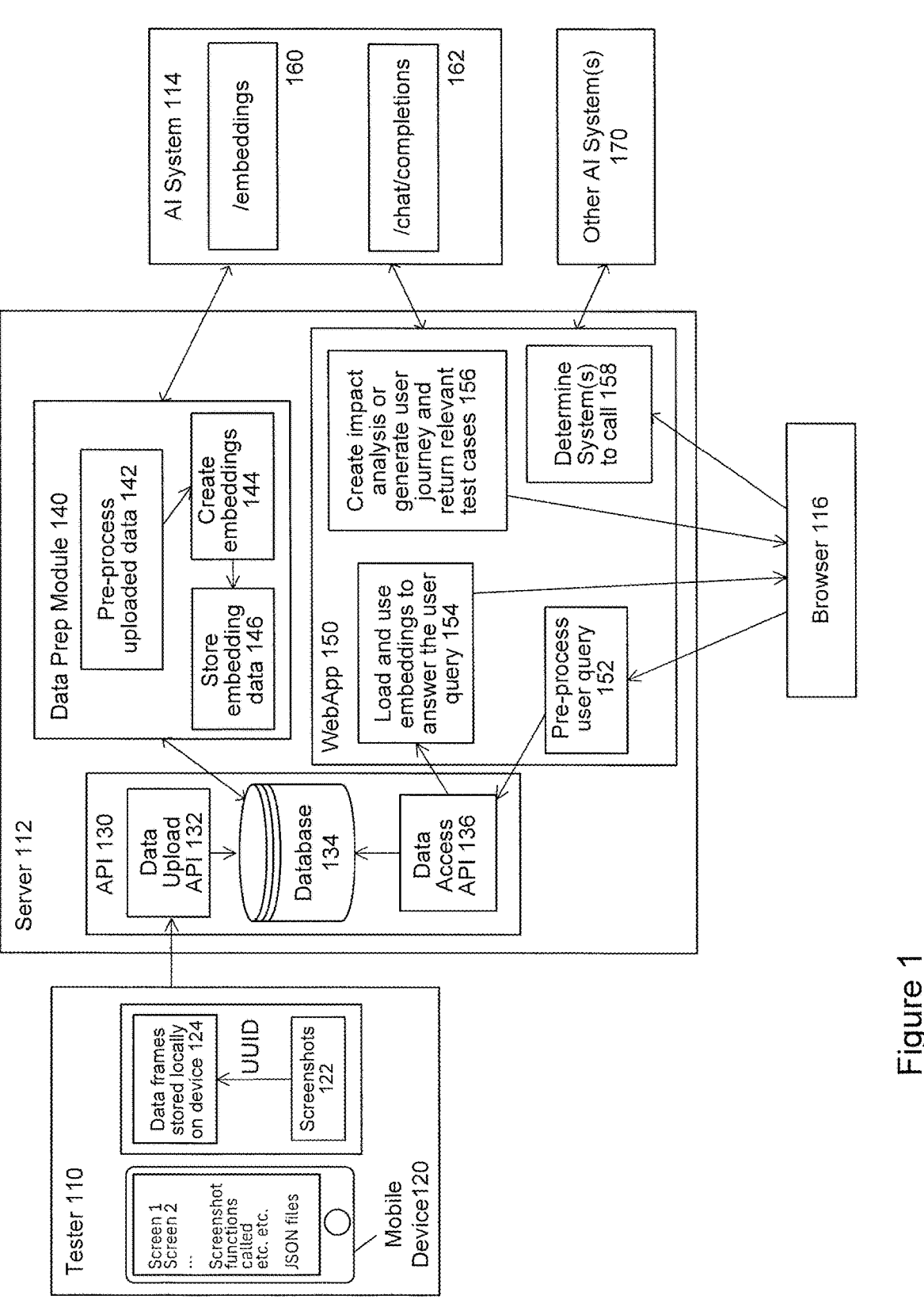
FIG. 1 is an exemplary diagram of a bidirectional visual indexing system, according to an embodiment of the present invention.

FIG. 1 is an exemplary diagram of a bidirectional visual indexing system, according to an embodiment of the present invention. A system for bidirectional visual indexing of a codebase and user interface with change-set risk quantification includes several interconnected components that work together to analyze code changes and assess their impact.

As shown in FIG. 1, Tester 110 interacts with a device, such as Mobile Device 120, to generate runtime data during application testing sessions. While Mobile Device 120 is shown for illustration purposes, other devices executing various applications may be supported. Mobile Device 120 may locally store screenshots 122 and corresponding data frames, as shown by 124, that capture application state information at specific points during execution. Screenshots 122 may be identified by an identifier (e.g., universally unique identifier (UUID)) and contain visual representations of the application interface, while data frames may include metadata such as function calls, network requests, analytics events, and/or application context information collected during runtime.

The system may include Server 112 that processes and analyzes the data collected from Mobile Device 120. Server 112 may include Application Programming Interface (API) 130 that facilitates communication between different system components. API 130 may include Data Upload API 132 that receives data from Mobile Device 120 and stores the information in Database 134. Data Access API 136 provides access to the stored data for analysis and retrieval operations. Server 112 may support multiple platform-specific software development kits (SDKs) that enable integration with various operating systems and environments. SDKs may be run as part of any system, including client-side components. Each SDK may be tailored to the specific requirements and capabilities of its target platform while maintaining compatibility with the overall system architecture.

Data Prep Module 140 within Server 112 may handle the preprocessing and preparation of uploaded data for analysis. Data Prep Module 140 may include components for preprocessing uploaded data as shown by 142, which may involve cleaning, formatting, and/or structuring the raw data received from Mobile Device 120. Data Prep Module 140 may also include functionality for creating embeddings as shown by 144, which may convert textual and visual data into vector representations suitable for similarity analysis and machine learning operations. Embeddings data may be stored, as shown by 146, to manage the vector representations in a format that enables efficient querying and comparison operations.

As further shown in FIG. 1, Server 112 may include a web application, shown by WebApp 150, that provides user-facing functionality for querying and analyzing the collected data. WebApp 150 may include a processing component for pre-processing user queries, as shown by 152, which may handle different types of input including text searches, screenshot uploads, code diff submissions, requests, etc. A component for loading embeddings, as shown by 154, may retrieve relevant vector representations for comparison with user queries. WebApp 150 may also include functionality for creating impact analysis and/or generating user journeys and relevant test cases, as shown by 156. Other outputs and reports on the potential effects of code changes may be supported. A determine system(s) to call component, as shown by 158, may identify which parts of the application may be affected by proposed modifications. WebApp 150 may interface with Browser 116 to provide access to these analytical capabilities through a web-based interface. Other interfaces, types of user input and system interactions may be supported.

The system may incorporate AI System 114 that provides artificial intelligence capabilities for data analysis and similarity matching. AI System 114 may support an embeddings endpoint 160 that generates vector representations of textual and/or visual data, and a chat completions endpoint 162 that provides natural language processing capabilities for generating impact analyses and user journey descriptions. AI System 114 may utilize different AI models and/or frameworks providing flexibility in the choice of underlying artificial intelligence technology. The system may also interface with additional AI systems, as shown by 170, to leverage multiple AI frameworks simultaneously and/or to provide redundancy and specialized capabilities for different types of analysis tasks.

The system architecture enables integration with external systems to enhance the analysis capabilities and provide comprehensive impact assessments. Server 112 may connect to external systems including JIRA for issue tracking, Adobe Analytics for traffic data, and test generation programs for QA test cases. These integrations allow the system to incorporate business context, historical defect information, and/or usage patterns into the impact analysis process. For example, Data Access API 136 may facilitate various external integrations by providing standardized interfaces for data exchange and synchronization with third-party systems. WebApp 150 may aggregate information from these various sources to provide comprehensive reports that combine technical impact analysis with business risk assessment and testing recommendations.

Figure 2:
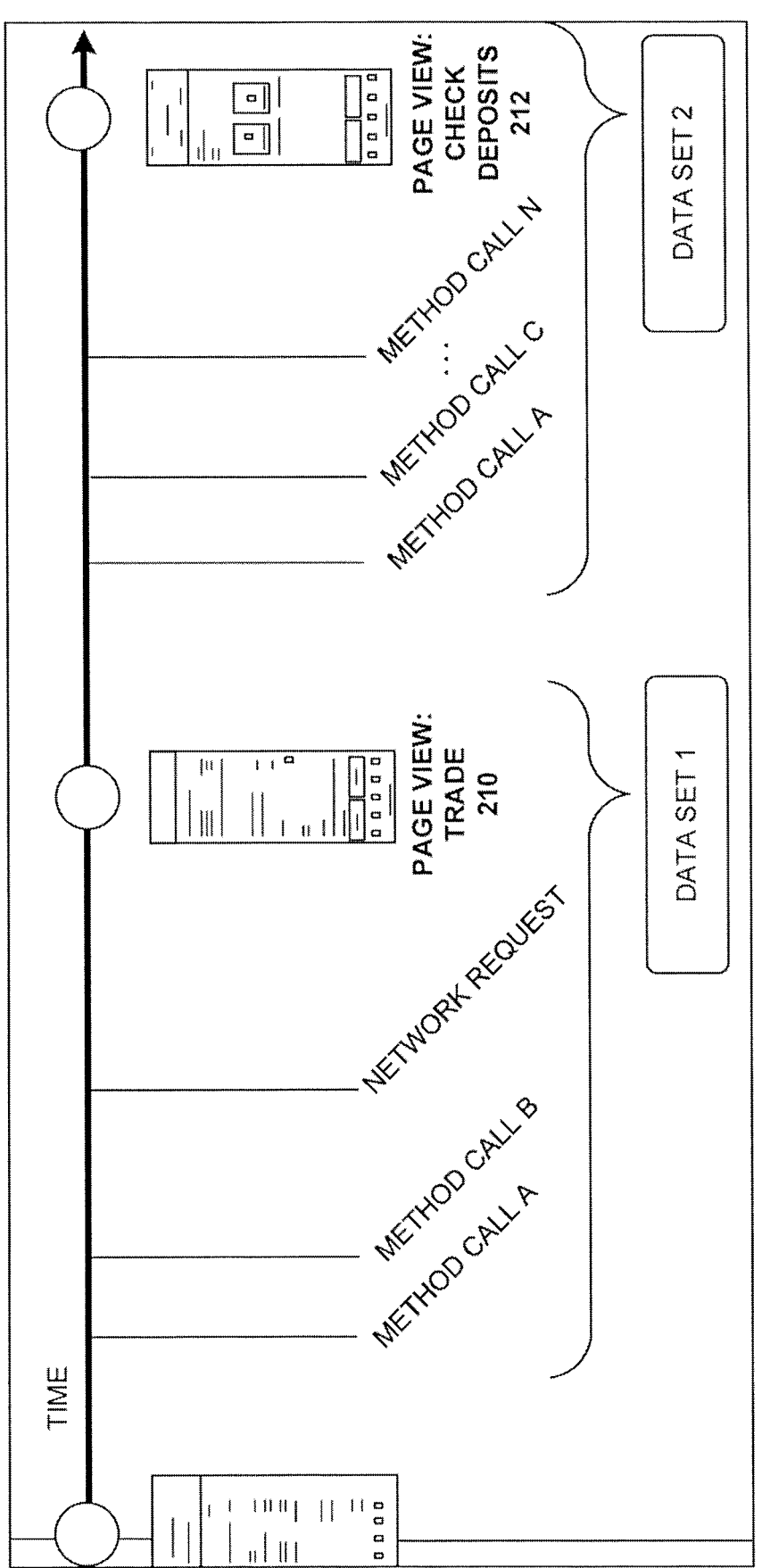
FIG. 2 is an exemplary sequence diagram, according to an embodiment of the present invention.

FIG. 2 is an exemplary sequence diagram, according to an embodiment of the present invention.

An embodiment of the present invention facilitates and assists consumer applications with data generation of data frames at runtime. In addition, an embodiment of the present invention enables users to query for code segments using text, code diffs, and contextual images; generates a comprehensive risk analysis describing the impact of a code change (s) in multiple levels; utilizes generative AI to perform similarity searches between user-submitted screenshots/inputs and the application's screens or pages; and utilizes generative AI to create user journeys.

As shown in FIG. 2, an embodiment of the present invention may dynamically generate data frames through a sequential process that captures runtime execution information during application testing sessions. The data frame generation process may begin when testing activities are initiated on a device, such as a mobile device, triggering a collection of method calls, network requests, and associated metadata. During runtime execution, an embodiment of the present invention monitors and records various types of method calls, including Method Call A and Method Call B, which may represent different functions or procedures executed within the application codebase. The sequence progresses through multiple execution points, with each method call contributing to the overall application state and user experience. The system captures network requests that occur during the execution sequence, providing insight into backend communications and data exchanges that support the application functionality.

The sequential execution of method calls and network requests may result in a generation of specific page views that represent distinct application screens or features. For example, a trade page as shown by 210 may result from a particular sequence of method calls and network requests, representing the visual interface and functionality associated with trading operations within the application. In another example, a check deposits page as shown by 212 may be generated through a different sequence of method calls, including Method Call A, Method Call C, and Method Call N, demonstrating how various execution paths lead to different application features. Data frames may capture context information surrounding each page view, including specific method calls that preceded the screen rendering, network requests that provided data for the display, and the temporal relationships between these execution events. Other interactions, metrics, actions, etc. may be captured.

An embodiment of the present invention uses runtime data to perform impact analyses. The system may work with a data frame which may include JSON data, where each JSON object represents a data frame. The data frame may represent a snapshot of the consumer application at a specific slice of its runtime. Each data frame may be associated with a set of data including for example: application metadata; screenshot metadata; analytics page name; analytics event; methods; network requests; etc. Application metadata may represent information that may be required to reproduce application bugs, such as username, application version, and the environment where the application was run (e.g., UAT). Screenshot metadata may represent a textual representation of a screenshot that was taken during the lifecycle of the data frame. This information may be extracted from the screenshot using OCR technology and/or other image analysis tools and techniques, and does not include Personally Identifiable Information (PII) such as financial data, social security numbers, or phone numbers. Analytics page name may include a page name or other identifier associated with the data frame and may map to a distinct feature within the application, such as deposits, money transfer, etc. Analytics event may represent an analytics event associated with the data frame and may map to an action the user performed while on the current page, such as a button tap or other user interaction. Methods may represent a set of functions that were invoked during the lifetime of the data frame. Network requests may represent network requests made during the lifetime of the data frame or other condition. Other data may be included or associated with a data frame.

To provide the system with information to generate an impact analysis, the application may call a corresponding SDK when certain conditions occur, such as a key function is invoked; an analytics page name has been invoked (e.g., the user navigates to a particular page, such as a deposits page); an analytics event has been invoked (e.g., the user taps on a form submit button); the tester starts running the application in a different environment (e.g., switch from a QA environment to a UAT environment); username or authentication status has changed; etc.

Each data frame may be associated with a start date and end date, and may be in one of two states, e.g., open or completed. While a data frame is open, its contents may be indirectly modified by the consumer. The associated user and application metadata may be modified by calling the SDK, and the list of associated functions and network calls may continue to grow. When the SDK receives a new analytics page name or event, the current data frame may be marked as complete, and a new data frame may be opened. The completed data frame may be assigned an end date, and functions and network requests that were made between its start and end date may be associated with it. The data frame may also be associated with one or more screenshots that reflect what was displayed on the application UI at the time the data frame was completed. The frame data may be converted into a format, such as a JSON format, that conforms to the schema required by the system, and sent over the network to a backend service.

The SDK may include a test harness that superimposes an interactive icon, such as tappable button, on the consumer application's user interface. Consumers may request the SDK to complete the current data frame by actioning the button through a manual action or automated process using a testing framework. For example, the test harness may facilitate controlled data frame generation during testing activities. The interactive icon (e.g., a tappable button) may be superimposed on the application's user interface, providing testers with a mechanism to manually trigger data frame completion and capture. When activated, the tappable button may cause the current data frame to be marked as complete, triggering the capture of a screenshot and the finalization of associated metadata. The test harness may support both manual activation through direct user interaction and automated activation through testing frameworks such as Appium or Selenium, enabling integration with existing automated testing workflows and continuous integration processes.

An embodiment of the present invention is directed to a data collection process of data frames. According to an embodiment of the present invention, users may run their application as part of regular regression testing. The SDK may generate data frames for a wide range of users, application flows, and scenarios. This also produces records of application states and user flows across multiple application releases. These data frames may be sent over the network and stored in a backend database for later processing.

As consumers continue to interact with the SDK, the highest-impact and most frequently-traversed flows, such as authentication and transactional flows, may eventually be well-represented in the data set. This allows the system to reflect the fact that different users may interact with the same feature in different ways. For example, some users of a client-facing financial application may be heavy options traders, while others primarily buy and sell short. Capturing a rich set of user journeys allows an embodiment of the present invention to generate accurate steps to reproduce the vast majority of application flows.

The more extensively an application is tested, the higher the likelihood that rare edge cases will make it into the data set. This allows the system to create user journeys for issues that are difficult to reproduce, and also generate more accurate impact analyses.

Because lower environments such as QA and UAT tend to be less stable compared to production, having a large set of user accounts and environments available enables developers and testers to quickly and easily find a path to reproduce any given issue.

Figure 3:
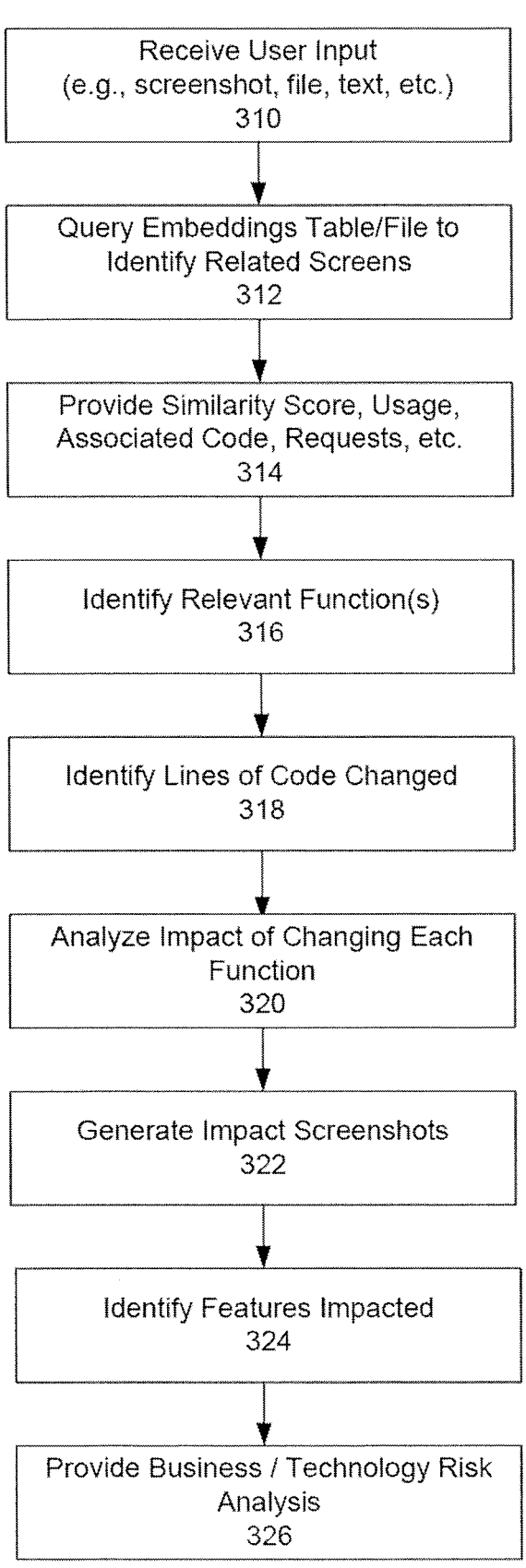
FIG. 3 is an exemplary flowchart for analyzing codebase impact, according to an embodiment of the present invention.

FIG. 3 is an exemplary flowchart for analyzing codebase impact, according to an embodiment of the present invention.

An embodiment of the present invention is directed to a comprehensive impact analysis process that transforms user input into detailed assessments of code change effects across the application. At step 310, user input may be received. At step 312, a corresponding embeddings table may be queried. At step 314, a similarity score and other metrics may be provided. At step 316, one or more relevant functions may be identified. At step 318, a set of code changes may be identified. At step 320, an impact of change may be analyzed for one or more identified functions. At step 322, impacted screenshots may be generated. At step 324, impacted features may be identified. At step 326, business and technology risk analysis may be provided. While the process of FIG. 3 illustrates certain steps performed in a particular order, it should be understood that the embodiments of the present invention may be practiced by adding one or more steps to the processes, omitting steps within the processes and/or altering the order in which one or more steps are performed. Additional details for each step are provided below.

At step 310, user input may be received. The system may receive a user input, which may include screenshots captured from application interfaces, text-based queries specifying function names or features, file uploads containing code modifications, URL submissions, and/or other data types that provide context for the analysis request. The user input may originate from various sources including developers submitting pull requests, testers reporting defects through screenshot submissions, product managers investigating the scope of proposed changes, etc. The system may accept inputs through various channels including a browser, API calls, automated submissions from integrated development environments and source control systems, etc.

At step 312, in response to the user request, a corresponding embeddings table may be queried to perform a similarity search. The system may query embeddings tables or files to identify screens and application components related to the submitted input. Vector representations of the user input may enable semantic comparison with previously stored embeddings created from the data frames. Vector representations may include key fields including functions (e.g., function name, line number, and the name of the file where the function was found), network requests, analytics data (e.g., pages and events), and screenshot metadata. The system may utilize the stored embedding data to perform similarity calculations that identify application screens with comparable functionality, visual appearance, code execution patterns, etc. For example, cosine similarity may be used to compute the degree of similarity between data frames and a user's query.

At step 314, a similarity score and other metrics may be provided. The system may provide comprehensive information about the identified related screens, including similarity scores that quantify the degree of relationship between the user input and each matching screen. The system may calculate these values based on multiple factors including visual similarity of screenshots, semantic similarity of extracted text content, and/or functional similarity of method calls and network requests associated with each screen. The system may also provide usage statistics that indicate how frequently each identified screen appears in testing sessions, helping users understand the relative importance and exposure of different application areas. Associated code information may include the specific functions, classes, and modules that execute when each screen renders, while network request details may specify the backend services and data exchanges that support each screen's functionality.

At step 316, one or more relevant functions may be identified. The system may identify relevant functions that may be affected by or related to the user's query, proposed code changes and/or other request. The system may utilize semantic analysis capabilities to identify functions that share similar names, parameters, and/or functionality patterns, even when the functions exist in different parts of the codebase or use varying naming conventions. The system may identify semantically similar functions and data fields across different parts of the codebase using AI embeddings, enabling detection of relationships that might not be apparent through traditional static code analysis. For example, functions named "accountName," "account_identifier," and "userAccountID" may be identified as semantically related despite their different naming patterns, allowing the system to provide comprehensive impact analysis that accounts for functional similarities across the entire application.

At step 318, a set of code changes may be identified. For example, a user or the system may identify specific lines of code that have changed or would be affected by the proposed modifications. The system may parse code diffs submitted through pull requests or version control integrations, extracting the exact file locations, line numbers, and code content that differs between versions. The analysis may extend beyond the directly modified lines to identify related code sections that may be affected by the changes, including functions that call the modified code, shared data structures that may be impacted, and configuration files that may need updates. The system may correlate these code changes with data frames and/or additional metadata to understand which application screens and/or user workflows may be affected by the modifications.

At step 320, an impact of change may be analyzed for an identified function. The system may analyze the impact of changing each identified function, examining how modifications to specific code components may affect related application features and user experiences. The system may trace function dependencies and call hierarchies to understand how changes propagate through the codebase, identifying both direct and indirect effects of proposed modifications. The analysis may consider data flow patterns, shared resource usage, and/or integration points with external systems to provide a comprehensive assessment of change impacts. In some cases, the system may process pull requests automatically to generate impact analysis for entire changesets rather than individual functions, enabling developers to understand the collective effect of multiple related code modifications submitted as a single change request.

At step 322, impacted screenshots may be generated to provide visual representations of the application areas that may be affected by the proposed code changes. The system may retrieve relevant screenshots from the database that correspond to the identified impacted screens, providing users with visual context for understanding the scope of potential changes. The impact screenshots may include multiple variations and/or permutations of each affected screen, showing different user account configurations, data states, and/or navigation paths that lead to the same functional area. The system may organize these screenshots according to similarity scores, usage frequency, and/or business impact metrics, enabling users to prioritize their testing and validation efforts based on the relative importance and risk associated with each affected area.

At step 324, impacted features may be identified. The features may be identified from the impacted screenshots. For example, the impacted screenshots may determine which application interfaces and features may be affected by the proposed code changes.

At step 326, business and technology risk analysis may be provided by combining technical impact assessments with business context and operational considerations. The system may integrate information from external sources including JIRA issue tracking systems to incorporate historical defect patterns, analytics data to understand user traffic and engagement patterns, and revenue impact metrics to quantify the business implications of potential disruptions. Other external systems and sources may be integrated and/or considered. The risk analysis may include fragility scores that indicate how prone specific code areas are to defects based on historical patterns, usage frequency metrics that show how often affected features are accessed by users, and business impact assessments that estimate potential revenue or operational effects of changes. For example, a chat completions endpoint within the AI system may generate natural language summaries that explain the risk assessment in terms accessible to both technical and non-technical stakeholders.

Figure 4:
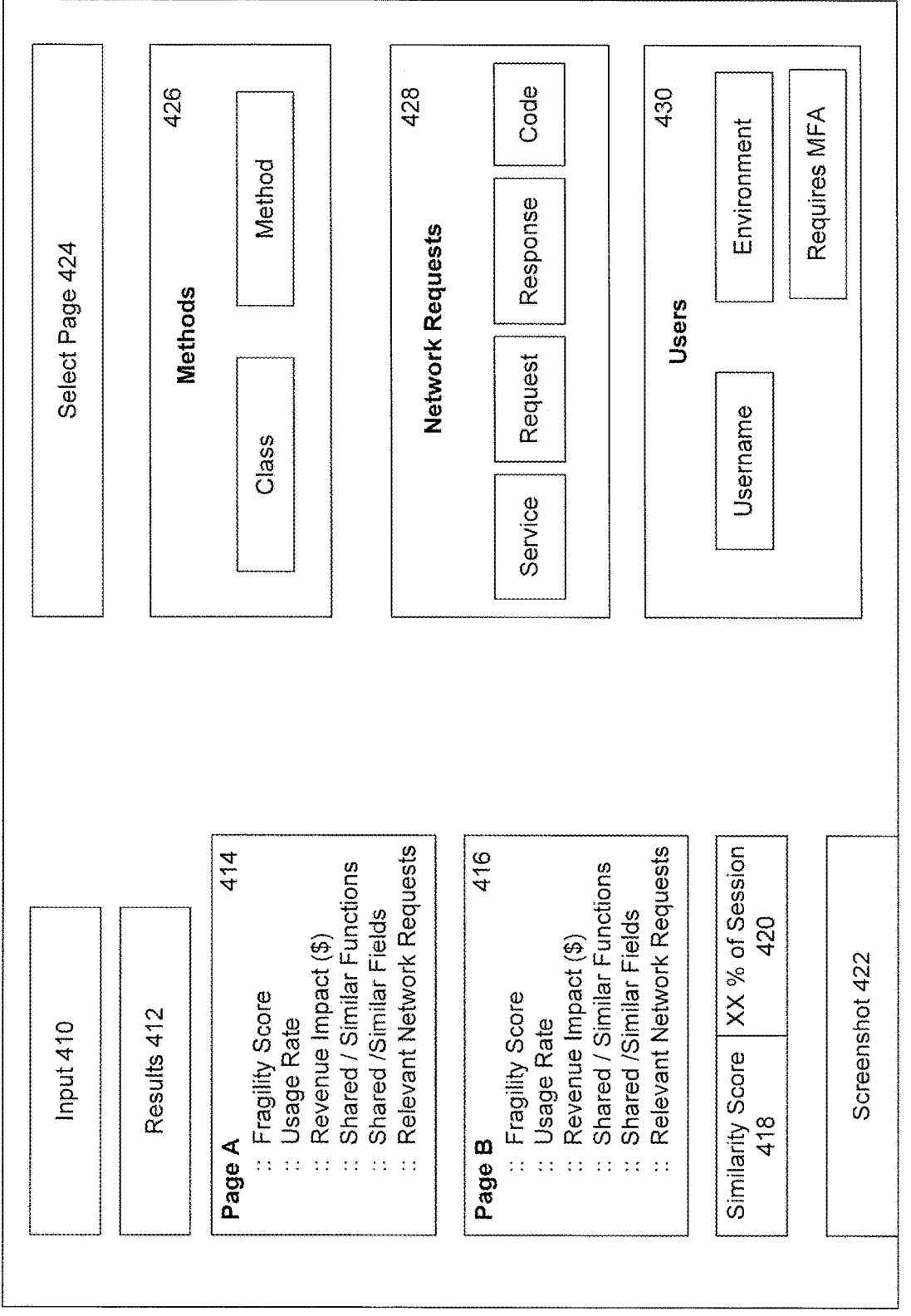
FIG. 4 is an exemplary user interface, according to an embodiment of the present invention.

FIG. 4 is an exemplary user interface, according to an embodiment of the present invention. As shown in FIG. 4, an embodiment of the present invention may incorporate various user interface components, data processors and modules to facilitate comprehensive analysis and visualization of application data.

An input interface, as shown by 410, enables users to provide various forms of input data, including screenshots, code files and/or metadata submissions from testing sessions. Input 410 may enable a user to search for a class, method and/or feature using various inputs, including a screenshot of a defect or error.

For text inputs, the user may enter the name of a function. A set of results that represent all of the analytics pages in its data set where the function was invoked may be returned. For each page that is returned in the search results, the user has the option to filter by a subset of its associated events. Page/event combinations may be displayed if the user-provided function is among the list of functions associated with the one or more of its data frames. Each page/event combination comes with one or more associated screenshots, the ability to generate a user journey for the specific flow, a set of relevant QA test cases for the flow, and the underlying data frames. Each data frame comes with a full list of associated methods, network requests, and app metadata.

For screenshots, the user may upload an application screenshot. Using OCR and/or other image analysis tools and techniques, the system may create a representation of the screenshot. These representations may be textual, visual, and/or in another relevant format, and may exclude PII fields such as account numbers, social security numbers, monetary data, etc. The system may then use an API to create an embedding, or a vector representation of the text. The system may compare this embedding against the data frame embeddings for the application. Given that this is a screenshot search, the screenshot metadata may be assigned a high weight in the similarity comparisons, making it the field that has the most influence on the similarity score. The analytics data may be assigned the next highest weight. The output is a list of data frames, ranked by similarity score.

For URL submissions, users may enter the link to a pull request, which contains a proposed set of code changes that a developer is looking to make to the consumer application. This link may come from a source control application, e.g., GitHub or Bitbucket. The system may extract the code diff from this pull request, convert it into a list of functions, and perform a textual search on each function. The result is similar to the results of the textual search, except there will be multiple pages of results-one for each entered function.

Based on the input received at Input 410, an embodiment of the present invention may perform search requests and query analysis to generate responses and analysis which may be provided at Results 412. For example, in response to an uploaded screenshot, an embodiment of the present invention may query an embeddings table to identify related screens.

In the example of FIG. 4, two pages or screens have been identified. The results may be ranked in order of similarity where a user may select a specific page at Select Page 424 to view related metadata and insights. The results may then be provided as Page A at 414 and Page B at 416 with corresponding detailed metadata, metrics, etc.

By selecting a specific method at 426, the system may provide an impact analysis that analyzes the impact of changing a particular function. Business and technical risks may be provided. For example, a risk of change may include: sensitivity of the change; and business impact and risks. The sensitivity of the change may represent affected high revenue pages that are frequently used with historical high notable defects. A breakdown of impacted pages may be provided with details shown in 414 and 416 for Page A and Page B, respectively. The impacted areas may also be identified in each corresponding screen. This enables the user to identify how code changes would affect the behavior of other parts of the application.

As shown by 414 (Page A) and 416 (Page B), results may contain comprehensive metadata about specific application states, including fragility scores that indicate code stability based on historical defect patterns, usage rates that reflect how frequently particular screens or features are accessed during testing sessions, and revenue impact metrics that quantify the business implications of potential changes to associated functionality. This is one exemplary set of metrics, additional data may be provided as well depending on the type of application, environment, customer specifics, regulatory considerations, restrictions, etc.

The system includes specialized processing modules that enhance the analysis capabilities and provide detailed insights into application behavior patterns. At 418, a similarity score may be provided and at 420, a percentage of session data may be displayed which may represent how often a screen is used. For example, a session percentage, shown by 420, may represent usage statistics that indicate how frequently specific screens, features, and/or code paths are encountered during testing sessions, enabling users to prioritize their analysis efforts based on actual usage patterns and exposure levels. A screenshot module, as shown by 422, may provide visual data captured during application testing.

The user interface of FIG. 4 may incorporate detailed interface components that provide comprehensive technical information about the analyzed application components. A methods interface, as shown by 426, displays detailed information about the code functions and procedures associated with each analyzed screen or feature, including class names, method signatures, parameter information, and execution context details that help developers understand the technical implementation behind each user interface element. Methods 426 may show methods invoked near the display of the screen. A network requests interface, as shown by 428, presents information about the backend communications and data exchanges that support each application feature, including service endpoints, request parameters, response codes, and data payload information that provides insight into the integration patterns and dependencies associated with each analyzed component. Network Requests 428 may represent requests made near the screen. A user interface, as shown by 430, contains authentication and session information including username details, environment specifications that indicate whether testing occurred in development, staging, or production contexts, and multi-factor authentication (MFA) requirements that affect user access patterns and security-related code execution paths.

The system supports code diff submissions via URL from source control applications such as GitHub or Bitbucket, enabling automated analysis of proposed code changes without requiring manual file uploads or copy-paste operations. Input 410 may include specialized processing capabilities that may retrieve code diff information directly from version control systems by parsing pull request URLs and extracting the associated change information. Input 410 may coordinate with external source control APIs to access diff data, parse the changes into individual function modifications, and correlate these changes with the stored data frames to identify potentially affected application areas. The system may process entire pull requests as single analysis units, enabling comprehensive impact assessment that considers the collective effect of multiple related code modifications rather than analyzing each change in isolation.

The system generates business impact analysis reports that include cost breakdowns, usage metrics, and functionality descriptions, providing stakeholders with comprehensive assessments that combine technical analysis with business context and operational considerations. This may include revenue impact calculations that estimate the financial implications of potential disruptions to specific application features or user workflows. The reports may incorporate usage metrics to quantify user exposure levels and help prioritize remediation efforts based on actual user impact rather than theoretical concerns. The business impact reports may also include functionality descriptions that explain the purpose and importance of affected features in business terms, enabling non-technical stakeholders to understand the implications of proposed changes and make informed decisions about risk tolerance and implementation timing.

Figure 5:
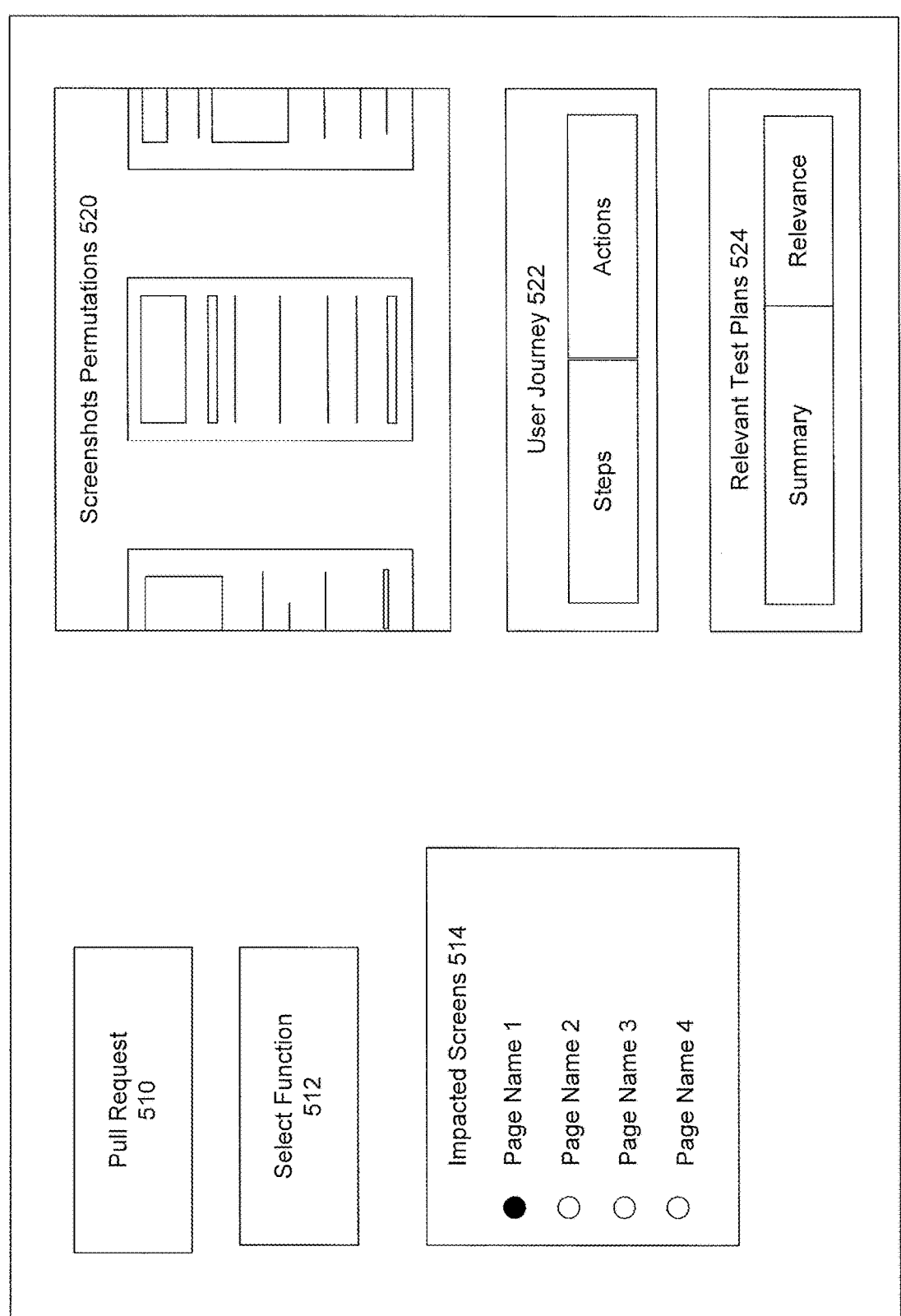
FIG. 5 is an exemplary user interface, according to an embodiment of the present invention.

FIG. 5 is an exemplary user interface, according to an embodiment of the present invention. As shown in FIG. 5, the system incorporates advanced code change analysis capabilities that enable comprehensive assessment of pull requests and their potential impacts across application components. Pull Request 510 serves as an entry point for automated analysis workflows, receiving code modification requests from developers through integration with source control systems such as GitHub, Bitbucket, or other version management platforms. Pull Request 510 may contain multiple file modifications, function changes, and/or associated metadata that provide context about the proposed changes and their intended purpose. The system may automatically monitor pull request submissions through webhook integrations or polling mechanisms, enabling real-time analysis of code changes as they are proposed by development teams. In some cases, Pull Request 510 may include branch comparison information that allows the system to identify the specific differences between the current codebase and the proposed modifications.

Select Function 512 may identify a function to view impacted screens. Select Function 512 may analyze the code changes within the pull request to extract and categorize the specific functions, methods, and/or code elements that have been modified or added. Select Function 512 may parse code diffs to identify changed line numbers, function signatures, and class modifications, creating a structured representation of the technical changes proposed within the pull request. Select Function 512 may also correlate the identified functions with the data frames to determine which application screens and user workflows may be affected by the proposed modifications. In some cases, Select Function 512 may identify semantically related functions across different parts of the codebase that share similar functionality or data processing patterns.

Impacted Screens 514 identifies screens impacted by changes to the identified function. In response to the identified function(s), Impacted Screens 514 may determine which application interfaces and user-facing features may be affected by the proposed code changes. Impacted Screens 514 may query the stored data frames to identify screens that invoke the modified functions during their rendering or interaction processes. The component may perform semantic matching between the identified functions and the method calls recorded within each data frame, enabling detection of impacts that may not be immediately apparent through direct function name matching. Impacted Screens 514 may present results organized by impact severity, usage frequency, and/or business importance metrics and revenue impact data. The component may also identify indirect impacts where changes to shared utility functions or data structures may affect multiple application areas that depend on these common components.

As further shown in FIG. 5, the system may include Screenshots Permutations 520 that provide visual representations of the various states and configurations that may be encountered for each impacted screen identified by Impacted Screens 514. Screenshots Permutations 520 may retrieve multiple screenshot variations from the screenshots stored within the mobile device and the database, showing how the same functional screen may appear under different user account configurations, data states, or navigation contexts. The component may organize these visual permutations based on similarity scores, enabling users to understand the range of visual presentations that may be affected by the proposed code changes. In some cases, Screenshots Permutations 520 may include error states, edge cases, or unusual data configurations that were captured during comprehensive testing sessions, providing insight into less common but potentially problematic scenarios that may be impacted by the code modifications.

An embodiment of the present invention is directed to generating navigation steps to a particular page or screen including which version to use, which environment, specific account information, etc. As shown in FIG. 5, User Journey 522 generates step-by-step navigation instructions that enable testers and developers to reproduce specific application states and reach the screens identified within Impacted Screens 514. User Journey 522 may process the sequential data captured within the data frames and generate human-readable instructions for navigating to specific application features. The component may include Steps and Actions that provide detailed guidance on user interactions, authentication requirements, and environmental configurations needed to reproduce particular application states. User Journey 522 may incorporate information from the user interface to specify which test accounts, environments, and authentication configurations are appropriate for accessing each identified screen. In some cases, User Journey 522 may generate multiple navigation paths for reaching the same destination screen, accounting for different user roles, account types, or application entry points that may lead to the same functional area.

To generate a concise and useful journey, the data frames may first be pre-filtered to remove cyclic navigations (e.g., scenarios where the user navigates back and forth between one or more pages, making no progress towards the destination screen). By identifying a subset of relevant data frames as input, an embodiment of the present invention may further filter out intermediate frames that are irrelevant to generating the user journey-such as multiple successive frames where the analytics page name and/or event does not materially change. It then uses the remaining data frames to craft the user journey steps.

An embodiment of the present invention may leverage various integrations to external systems of the software development life cycle along generated user journey data. This gives the ability to automate additional processes such as identifying or executing test cases for code changes using generative AI.

The system may take its generative AI output such as the user journey and other context to perform similarity search against various parts of testing data such as test case description and details to identify a ranked list of relevant test cases that should be run. This provides the test coverage needed to catch functional regression issues.

By leveraging the code impact analysis at the function level, an embodiment of the present invention may also identify related test cases at a broader technical scope where functional test cases lack context. For example, when there is a change to an app wide UI component, the system may identify all screens and test cases that use that UI component.

In addition, Relevant Test Plans 524 identifies and prioritizes testing activities that should be performed to validate the proposed code changes and ensure that modifications do not introduce regressions or unexpected behavior. Relevant Test Plans 524 may include Summary and Relevance sections that provide contextual information about each recommended test case and explain why particular testing activities are appropriate for the identified code changes. The component may integrate with external testing systems to correlate the identified Impacted Screens 514 with existing test case libraries and automated testing frameworks. Relevant Test Plans 524 may utilize generative AI capabilities to automatically identify and execute relevant test cases based on the specific code changes identified within Select Function 512, enabling automated validation workflows that reduce manual testing overhead and improve change validation coverage.

The system supports integration directly into integrated development environments (IDE) such as Xcode, Visual Studio, or other development platforms, enabling developers to access impact analysis capabilities without leaving their primary development workflow. The IDE integration may display affected screenshots and testing recommendations directly within the development environment as developers modify code, providing real-time feedback about the potential impacts of their changes. The integration may utilize the web application APIs to retrieve analysis results and present them through IDE-specific interface components such as side panels, popup windows, and/or integrated browser views. In some cases, the IDE integration may enable developers to execute recommended tests directly from their development environment, coordinating with automated testing frameworks to validate changes before code submission. The integration may also provide access to the user journey instructions, enabling developers to manually reproduce affected application states for debugging and validation purposes.

The system extends beyond traditional graphical user interface applications to support analysis of web applications and backend server-based codebases that may not have visual interface components. For web applications, the system may capture various object model structure information, HTTP request patterns, and server-side rendering data as alternatives to traditional mobile screenshots. Backend server analysis may focus on API endpoint modifications, database query changes, and service integration impacts. The system may adapt the data frames structure to accommodate different application architectures, storing relevant metadata such as API response formats, database schema changes, or service dependency modifications that correspond to the visual and interaction data captured for traditional user interface applications.

The system accommodates command line applications and other text-based interfaces that produce purely textual output rather than graphical user interfaces. In addition, the system enables product owners and business stakeholders to define custom risk thresholds and classifications based on their specific business requirements and operational priorities.

An embodiment of the present invention provides specific technical improvements to computer functionality that address concrete problems in software development environments. The data collection module generates structured data frames during runtime execution that capture temporal relationships between method invocations, network requests, and visual interface states in a manner that was not previously possible with conventional static code analysis tools. The system transforms code relationships into concrete, query-able data structures by correlating execution-time method calls with specific visual interface elements captured through screenshot analysis and optical character recognition processing.

The artificial intelligence processing module performs computationally intensive vector similarity calculations using cosine similarity algorithms applied to embeddings generated from multi-modal data sources including visual screenshots, textual code content, and execution metadata. The system implements bidirectional search capabilities that enable semantic matching between disparate data types, requiring specialized computer processing to convert visual interface elements into searchable vector representations and correlate these with code execution patterns. The embeddings generation process involves complex mathematical transformations that convert textual and visual data into high-dimensional vector spaces, enabling similarity comparisons that would be computationally infeasible using traditional string matching or visual comparison techniques.

The system addresses the technical problem of impact analysis in large codebases by implementing automated correlation mechanisms between code modifications and their runtime effects on user interfaces. The functions identification component utilizes specialized parsing algorithms to extract semantic meaning from code differentials and correlate these changes with previously captured execution data stored in the data frames. The impacted screens component performs complex database queries against vector embeddings to identify potentially affected application areas, implementing similarity threshold calculations and ranking algorithms that prioritize results based on multiple technical factors including execution frequency, code complexity, and historical defect patterns.

The bidirectional search interface implements specialized query processing that accepts multiple input modalities including visual screenshots, textual function names, and structured code differentials, requiring distinct processing pathways for each input type. Screenshot inputs undergo optical character recognition processing followed by text extraction and vector embedding generation, while code differential inputs require parsing, semantic analysis, and correlation with stored execution data. According to an embodiment of the present invention, all modes of input into the system may leverage vector embeddings generation and comparison against embeddings for semantic similarity. The system maintains synchronized data structures across multiple storage systems including local mobile device storage, centralized databases, and vector embedding repositories, implementing data consistency mechanisms that ensure accurate correlation between visual interface captures and their associated code execution contexts.

The system generates automated user journey instructions through natural language processing of sequential execution data, implementing algorithms that identify optimal navigation paths while filtering out redundant or cyclic user interactions. The relevant test plans component utilizes machine learning techniques to correlate code changes with existing test case libraries, implementing similarity scoring algorithms that rank test cases based on their relevance to specific code modifications. These technical implementations require specialized computer processing capabilities including vector database operations, natural language generation, and multi-modal data correlation that extend beyond conventional software development tools and provide concrete improvements to the efficiency and accuracy of code change impact assessment processes.

While the processes of the Figures illustrate certain steps performed in a particular order, it should be understood that the embodiments of the present invention may be practiced by adding one or more steps to the processes, omitting steps within the processes and/or altering the order in which one or more steps are performed.

The system components illustrated in the Figures above are exemplary and illustrative and may interact with additional modules, a combination of the modules described and/or less modules than illustrated. While a single illustrative block, module or component is shown, these illustrative blocks, modules or components may be multiplied for various applications or different application environments. In addition, the modules or components may be further combined into a consolidated unit. The modules and/or components may be further duplicated, combined and/or separated across multiple systems at local and/or remote locations. Other architectures may be realized.

The systems illustrated above may be implemented in a variety of ways. Architecture within the illustrated systems may be implemented as hardware components (e.g., module) within one or more network elements. It should also be appreciated that architecture within the systems may be implemented in computer executable software (e.g., on a tangible, non-transitory computer-readable medium) located within one or more network elements. Module functionality of architecture within the systems may be located on a single device or distributed across a plurality of devices including one or more centralized servers and one or more mobile units or end user devices. The architecture depicted in the systems is meant to be exemplary and non-limiting. For example, while connections and relationships between the elements of the systems are depicted, it should be appreciated that other connections and relationships are possible. The systems described above may be used to implement the various methods herein, by way of example. Various elements of the systems may be referenced in explaining the exemplary methods described herein.

Connections illustrated in the Figures above may represent networks including wireless network, a wired network or any combination of wireless network and wired network. Networks may further include one, or any number of the exemplary types of networks operating as a stand-alone network or in cooperation with each other. Networks may utilize one or more protocols of one or more network elements to which it is communicatively coupled. Networks may translate to or from other protocols to one or more protocols of network devices. Although the connections in the Figures may be depicted as one network for simplicity, it should be appreciated that according to one or more embodiments, Networks may comprise a plurality of inter-connected networks, such as, for example, a service provider network, the Internet, a cellular network, corporate networks, or even home networks, or any of the types of networks mentioned above.

Data may be transmitted and received via networks utilizing a standard networking protocol or a standard telecommunications protocol. For example, data may be transmitted using protocols and systems suitable for transmitting and receiving data. Data may be transmitted and received wirelessly or in some cases may utilize cabled network or telecom connections or other wired network connection.

While the Figures above illustrate individual devices or components, it should be appreciated that there may be several of such devices to carry out the various exemplary embodiments. Systems may communicate using any mobile or computing device capable of sending or receiving network signals.

Systems may be communicatively coupled to various local and remote storage components. These storage components may include any suitable data structure to maintain the information and allow access and retrieval of the information. The storage may be local, remote, or a combination. The storage components may have back-up capability built in. Communications with the storage components may be over a network or communications may involve a direct connection between the various storage components, as depicted in the Figures above. The storage components may also represent cloud or other network based storage.

Those skilled in the art will appreciate that the diagrams discussed above are merely examples of a system and a method for implementing bidirectional visual indexing systems and are not intended to be limiting. Other types and configurations of networks, servers, databases and personal computing devices (e.g., desktop computers, tablet computers, mobile computing devices, smart phones, etc.) may be used with exemplary embodiments of the invention.

Although the foregoing examples show the various embodiments of the invention in one physical configuration, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. The components of the various embodiments may be arranged at any location or locations within a distributed network without affecting the operation of the respective system.

Although examples of servers, databases, and personal computing devices have been described above, exemplary embodiments of the invention may utilize other types of devices whereby a user may interact with a network that transmits and delivers data and information used by the various systems and methods described herein. These devices may further include an electronic memory such as a random access memory (RAM), electronically programmable read only memory (EPROM), other computer chip-based memory, a hard drive, or other magnetic, electrical, optical or other media, and other associated components connected over an electronic bus, as will be appreciated by persons skilled in the art.

In some embodiments, the computing devices may be equipped with an integral or connectable liquid crystal display (LCD), electroluminescent display, a light emitting diode (LED), organic light emitting diode (OLED) or another display screen, panel or device for viewing and manipulating files, data and other resources, for instance using a graphical user interface (GUI) or a command line interface (CLI). The personal computing devices may also include a network-enabled appliance or another TCP/IP client or other device.

The servers, databases, and personal computing devices described above may include at least one accelerated processing unit, such as a GPU or FPGA, and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software. The modules described above may comprise software stored in the memory (e.g., non-transitory computer readable medium containing program code instructions executed by the processor) for executing the methods described herein.

Any suitable programming language may be used in accordance with the various embodiments of the invention. For example, the programming language used may include assembly language, Ada, APL, Basic, C, C++, dBase, Forth, HTML, .NET, Python, Java, Modula-2, Pascal, Prolog, REXX, Visual Basic, JavaScript and other languages. Further, it is not necessary that a single type of instructions or single programming language be utilized in conjunction with the operation of the system and method of the invention. Rather, any number of different programming languages may be utilized as is necessary or desirable.

The software, hardware and services described herein may be provided utilizing one or more cloud service models, such as Software-as-a-Service (SaaS), Platform-as-a-Service (PaaS), Infrastructure-as-a-Service (IaaS), and Logging as a Service (LaaS), and/or using one or more deployment models such as public cloud, private cloud, hybrid cloud, and/or community cloud models.

In the system and method of exemplary embodiments of the invention, a variety of "user interfaces" may be utilized to allow a user to interface with the personal computing devices. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor.

Although the embodiments of the invention have been described herein in the context of a particular implementation in a particular environment for a particular purpose, those skilled in the art will recognize that its usefulness is not limited thereto and that the embodiments of the invention can be beneficially implemented in other related environments for similar purposes.

The foregoing description, along with its associated embodiments, has been presented for purposes of illustration only. It is not exhaustive and does not limit the invention to the precise form disclosed. Those skilled in the art may appreciate from the foregoing description that modifications and variations are possible in light of the above teachings or may be acquired from practicing the disclosed embodiments. For example, the steps described need not be performed in the same sequence discussed or with the same degree of separation. Likewise various steps may be omitted, repeated, or combined, as necessary, to achieve the same or similar objectives. Accordingly, the invention is not limited to the above-described embodiments, but instead is defined by the appended claims in light of their full scope of equivalents. The specification and drawings are accordingly to be regarded as an illustrative rather than restrictive sense.

What is claimed is:

1. A computer-implemented system for bidirectional visual indexing of a codebase, comprising:

an input interface configured to receive one or more inputs from an interaction with an application executing on a device;

a database configured to store data frames captured during runtime of the application wherein the database uses a data collection module configured to generate data frames during runtime execution of the application, and wherein the data collection module is configured to maintain data frames in open and completed states, where open data frames allow modification of associated metadata and function lists, and completed data frames are assigned end dates and converted to a JSON format for network transmission; and a server comprising a computer processor coupled to the interface and the database and further configured to perform the steps of:

receiving a user input comprising at least one of: a screenshot, a text query, a code diff or a URL link;

querying the database to identify one or more related screens based on the user input by comparing vector representations of the user input and a set of data frames;

providing a set of metadata for the identified one or more related screens wherein the set of metadata comprises: similarity scores, usage statistics, associated code segments, and network requests;

identifying at least one relevant function associated with each of the one or more related screens;

performing an impact analysis related to modifying the at least one relevant function using an artificial intelligence (AI) processor; and generating a risk analysis for the modifying of the at least one relevant function.

2. The system of claim 1, wherein each data frame of the set of data frames comprises a combination of: application metadata, screenshot metadata, usage metrics, method invocations made during the data frame lifetime, and network requests made during a lifetime of each data frame.

3. The system of claim 1, wherein the database is configured to store vector representations of data frame components using an embeddings application programming interface.

4. The system of claim 1, wherein the server performs one or more similarity searches using cosine similarity calculations to identify the one or more related screens.

5. The system of claim 1, wherein the server generates a user journey that provides a series of steps and corresponding actions to reach at least one impacted screen represented by a data frame.

6. The system of claim 1, wherein the server generates a test plan that comprises a set of testing activities to perform to validate one or more code changes.

7. The system of claim 1, wherein the server is configured to perform the steps of:

identifying one or more lines of code affected by the modifying of the at least one function; and generating one or more impact screens providing a visual representation of one or more affected application areas.

8. The system of claim 1, wherein the link comprises a link to a pull request that contains a proposed set of code changes to make to the application.

9. A computer-implemented method for bidirectional visual indexing of a codebase, comprising the steps of:

receiving, via an input interface, a user input comprising at least one of: a screenshot, a text query, a code diff or a URL link, wherein the input interface is configured to receive one or more inputs from an interaction with an application executing on a device;

querying a database to identify one or more related screens based on the user input by comparing vector representations of the user input and a set of data frames, wherein the database is configured to store data frames captured during runtime of the application, wherein the database uses a data collection module configured to generate data frames during runtime execution of the application, and wherein the data collection module is configured to maintain data frames in open and completed states, where open data frames allow modification of associated metadata and function lists, and completed data frames are assigned end dates and converted to a JSON format for network transmission;

providing a set of metadata for the identified one or more related screens wherein the set of metadata comprises: similarity scores, usage statistics, associated code segments, and network requests;

identifying at least one relevant function associated with each of the one or more related screens;

performing an impact analysis related to modifying the at least one relevant function using an artificial intelligence (AI) processor; and generating a risk analysis for the modifying of the at least one relevant function.

10. The method of claim 9, wherein each data frame of the set of data frames comprises a combination of: application metadata, screenshot metadata, usage metrics, method invocations made during the data frame lifetime, and network requests made during a lifetime of each data frame.

11. The method of claim 9, wherein the database is configured to store vector representations of data frame components using an embeddings application programming interface.

12. The method of claim 9, wherein the server performs one or more similarity searches using cosine similarity calculations to identify the one or more related screens.

13. The method of claim 9, wherein the server generates a user journey that provides a series of steps and corresponding actions to reach at least one impacted screen represented by a data frame.

14. The method of claim 9, wherein the server generates a test plan that comprises a set of testing activities to perform to validate one or more code changes.

15. The method of claim 9, further comprising the steps of:

identifying one or more lines of code affected by the modifying of the at least one function; and generating one or more impact screens providing a visual representation of one or more affected application areas.

16. The method of claim 9, wherein the link comprises a link to a pull request that contains a proposed set of code changes to make to the application.

* * * * *